UNITED STATES PATENT OFFICE.

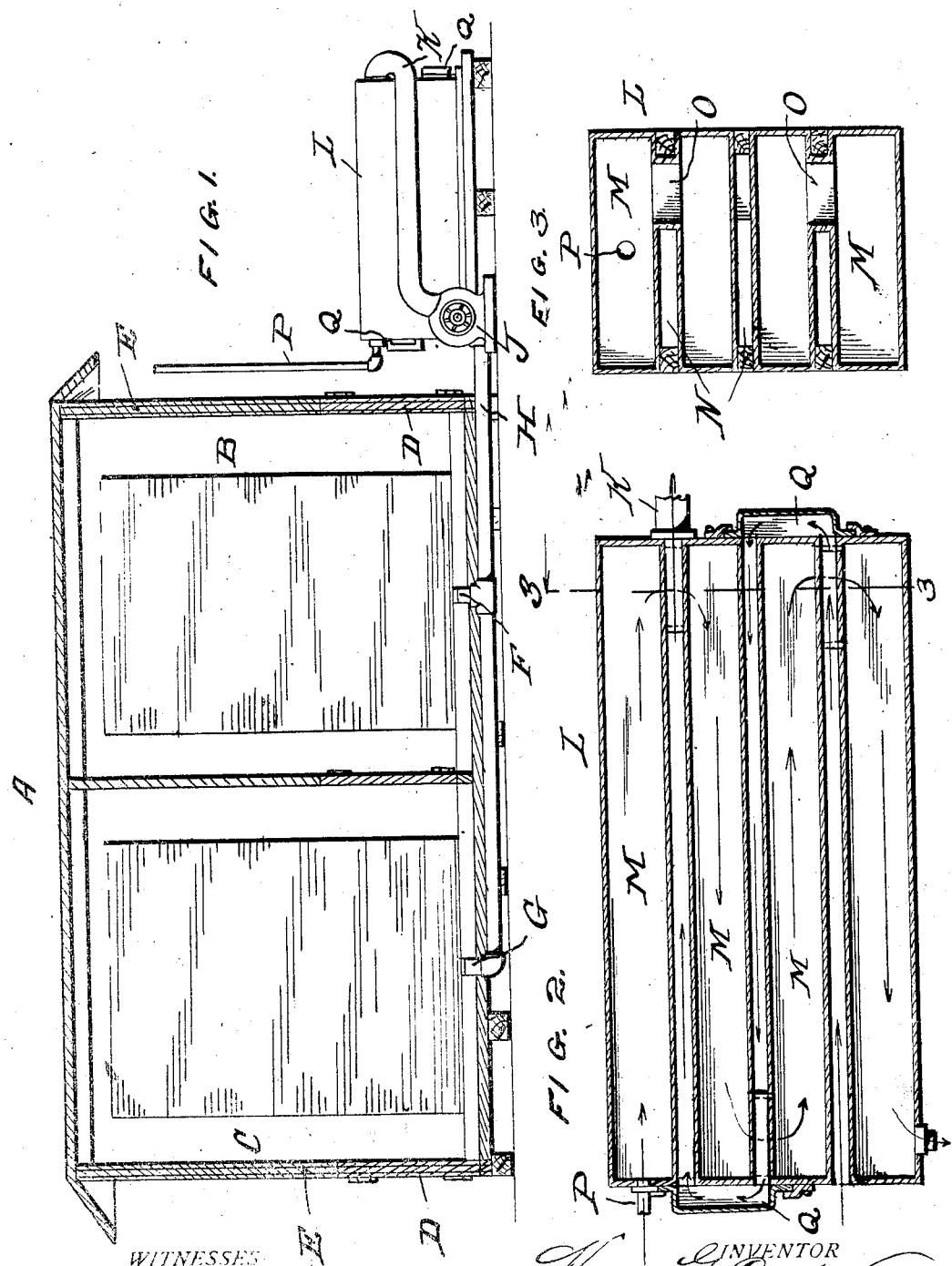

HENRY G. CADY, OF ST. LOUIS, MISSOURI.

LUMBER-DRIER.

933,744.

Specification of Letters Patent. Patented Sept. 14, 1909.

Application filed March 8, 1909. Serial No. 482,073.

*To all whom it may concern:*

Be it known that I, HENRY G. CADY, a citizen of the United States, residing at St. Louis, in the State of Missouri, have invented certain new and useful Improvements in Lumber-Driers, of which the following is a specification.

My invention relates to improvements in lumber driers, and the object of my invention is the provision of a lumber drier in which waste or exhaust steam is used in connection with suitable means and in which a thorough, efficient, and practical drying of the lumber is insured.

To attain the desired object, the invention consists of a lumber drier embodying novel features of construction and combination of parts for service substantially as disclosed herein.

In order that the construction in detail and the operation and advantages of my system may be fully understood and appreciated, I invite attention to the accompanying drawings.

Figure 1, represents a longitudinal sectional view of the drying house with the apparatus for drying shown in side elevation. Fig. 2, represents a longitudinal sectional view of the drying apparatus on a large scale, and, Fig. 3, represents a transverse sectional view on the line 3—3 of Fig. 2.

In the drawings: A, designates the drying house which preferably consists of two compartments or chambers B, and C, provided with access doors D, suitably located, and the outer or side walls are preferably provided with an interposed heat retaining material E.

Leading from the compartments or chambers B, and C, are the short hot air conducting pipes F and G, said pipes being coupled to form communication with the hot air supply pipe H. The pipe H, leads from the fan J, and the casing of the fan receives the hot air feed pipe K, said pipe communicating directly with the apparatus.

The drying apparatus consists of a longitudinal casing L, divided into the steam chambers M, and the hot air chambers N, said steam chambers communicating through the medium of openings or passages O, and the steam entering the top chamber through the pipe P. I also provide the removable casings Q, at each end of the apparatus.

From the foregoing description taken in connection with the drawings, the operation of my drier will be readily understood, and the steam enters the casing at the upper steam chamber M, through the pipe P, and passes in zigzag fashion through the series of chambers heating the air in the hot air chambers N, which hot air is taken through the pipe K, and by means of the fan forced through the pipe H, to the drying chambers, thus in a simple, inexpensive, and practical manner the drying is effected.

I have stated that my drier is used in the drying of lumber, but it is evident that it may be used for drying fruit, or for any other purpose where it could be efficiently employed.

I claim:

1. In a device of the character described, an air heater comprising a series of hollow rectangular prisms spaced apart, passages connecting the same at alternate ends, means connecting the adjacent longitudinal edges of the prisms and making an air tight joint therewith, said means and the adjacent faces of the prisms forming an open ended chamber therebetween, casings slidably secured to alternate prisms at opposite ends and affording zigzag communication between the chambers, means for introducing steam into the upper-most prism and for leading it from the undermost, and means for causing a current of air to enter the bottom chamber and pass through the intermediate chambers and out of the uppermost.

2. In a heater, a series of casings forming chambers, longitudinal means making air tight joints with the casings inserted therebetween and forming open-ended chambers or spaces between the casings, tubes passing vertically through said spaces and connecting adjacent chambers at alternate ends, a steam inlet pipe entering the uppermost chamber, a steam outlet pipe for the lowermost, closures for the spaces between the chambers slidably secured to alternate casings at opposite ends, said closures being so constructed and arranged as to permit the air to pass around the end of the intermediate casing, one end of the basal space being left open to permit air to enter said spaces, and means having connection with the uppermost space for causing the circulation of air through said spaces.

In testimony whereof I affix my signature, in presence of two witnesses.

HENRY G. CADY.

Witnesses:
CHARLES S. WILMETH,
CHAS. B. GROVE.